United States Patent [19]

Gold et al.

[11] Patent Number: 4,816,832

[45] Date of Patent: Mar. 28, 1989

[54] CONTINUOUS REPEATER TARGET DENTAL DEVICE

[75] Inventors: Archie Gold, Bethesda, Md.; Robert L. Kirkwood, Pacific Palisades, Calif.; Steven L. West, Tijeras, N. Mex.

[73] Assignee: R & D Associates, Marina Del Rey, Calif.

[21] Appl. No.: 830,957

[22] Filed: Feb. 19, 1986

[51] Int. Cl.⁴ .............................................. H04K 3/00
[52] U.S. Cl. ......................................... 342/14; 342/15
[58] Field of Search .............................. 342/15, 13, 14

[56] References Cited

U.S. PATENT DOCUMENTS

| | | | |
|---|---|---|---|
| 3,015,096 | 12/1961 | Deloraine et al. | 342/15 |
| 3,225,300 | 12/1965 | Barney et al. | 342/15 |
| 3,715,755 | 2/1973 | Goldan | 342/15 |
| 3,852,747 | 12/1974 | Morand | 342/15 |
| 3,891,989 | 6/1975 | Barney et al. | 342/15 |
| 3,896,438 | 7/1975 | Schrader, Jr. | 342/15 |
| 3,896,441 | 7/1975 | Richmond | 342/15 |
| 3,983,482 | 9/1976 | Doherty | 342/15 X |
| 4,072,949 | 2/1978 | Van Brant | 342/15 |
| 4,145,691 | 3/1979 | Freeling et al. | 342/15 |
| 4,160,957 | 7/1979 | Jesinger | 342/15 X |
| 4,328,496 | 5/1982 | White | 342/15 |

FOREIGN PATENT DOCUMENTS

1532777  11/1978  United Kingdom ................. 342/15

OTHER PUBLICATIONS

Wolkstein et al, "The Loop TWT, Key to Range Deception", Microwaves, Nov. 1969, pp. 73–79.
Bell et al, "Electron Bombarded Semiconductors for Fast Rise Time Modulators", Countermeasures, Aug. 1976, pp. 43–49, vol. 2, No. 8.

Primary Examiner—Thomas H. Tarcza
Assistant Examiner—John B. Sotomayor
Attorney, Agent, or Firm—Freilich, Hornbaker, Rosen & Fernandez

[57] ABSTRACT

A circuit is described which receives enemy radar signals in the form of encoded bursts or pulses, and which immediately generates and transmits, in sequence, a large number of target denial signals which are similar to the received signal. The transmitted signal masks signals from friendly craft, and deceives the enemy by providing rational false targets for him to engage. The carrier frequency of the enemy or threat, signal is detected, and is used to select one of a group of local oscillation signals which are superheterodyned with the received signal to produce an IF (intermediate frequency) signal which is recirculated and and superheterodyned with the local oscillator frequency to produce a series of signals for transmission that are similar to the received signal. The amplitude and offset doppler of each of the target denial signals are individually controlled prior to retransmission to maximize performance. In the recirculation loop, the circulated signal is hard limited, or clipped, and is also low limited, and also passed through a contoured bandpass to avoid the build up of noise.

10 Claims, 3 Drawing Sheets

CONTINUOUS REPEATER TARGET DENIAL DEVICE

BACKGROUND OF THE INVENTION

Enemy radar signals for detecting friendly craft and the like, often include a short (e.g., 1 microsecond) burst or pulse of energy of a microwave frequency (e.g., 1–35 GHz) encoded by modulation that produces a signal bandwidth such as 10 MHz. The denial, or jamming, of such a threat radar signal can often be effectively achieved by sequentially retransmitting, for each enemy-transmitted burst, a large number of bursts each similar to the enemy-transmitted burst. The bursts are retransmitted from a location between the enemy radar and friendly craft, but with amplitude and doppler modulation designed to cover, confuse and deceive the enemy radar operation and/or his equipment. A large number of such transmitted signals, such as 700 of them, is often very much more effective in denying the enemy radar system the ability to target friendly craft than only a few. However, it was found in the prior art, that when a large number of signals were sequentially generated by circulating the received and encoded signal through a loop, that noise and the like was repeatedly amplified at every passage through the loop, so that the encoded signal was lost to noise after several passes. A continuous repeater target denial device which could produce a long sequence of realistic target-like signals which are acted upon by the threat radar exactly in the same manner as true target signals, and which was of relatively simple and compact construction, would be of considerable value.

SUMMARY OF THE INVENTION

In accordance with one embodiment of the present invention, a target denial device of relatively simple and compact construction is provided, which can generate a large number of signal bursts that are all similar to a received signal burst. The device can be constructed so the large number of signal bursts have a controlled amplitude and phase modulation from pulse to pulse such as to be identical to the signals returned from real targets. The apparatus can include a recirculation loop which has an input for receiving a modified received burst such as an intermediate frequency representation of the received signal, and an output which sequentially delivers a large number of signal bursts that are each similar to the received signal burst. The recirculation loop can include an amplifier, a hard limiter which clips a circulating signal to limit all portions that are above a predetermined level to that level, and a low level limiter for blocking the portions of the circulating signal which are less than a low predetermined level. The hard limiter assures that the repeatedly amplified circulating signal is limited in amplitude, but the relative phase is preserved, while the low level limiter assures that noise below a defined threshold does not build up in amplitude.

The target denial device can include a plurality of detectors that each detect a different frequency band of the received signal. A group of local oscillator frequencies is generated, and one of them is selected according to the detected frequency band. The selected local oscillator is superheterodyned against the received signal, to produce an intermediate signal of low enough frequency to be processed by the recirculating loop.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
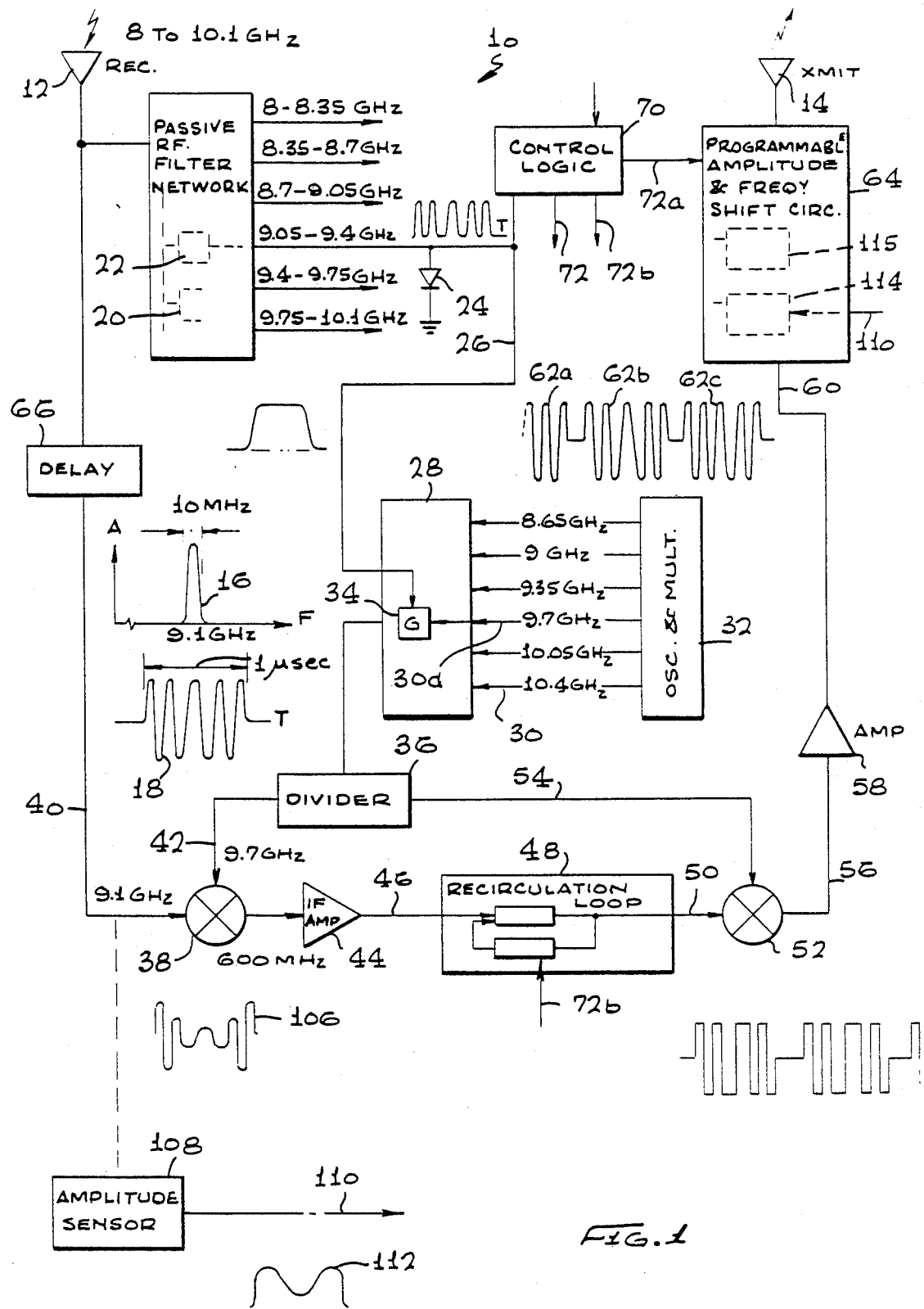
FIG. 1 is a block diagram of a repeater target denial apparatus constructed in accordance with the invention.

FIG. 1 illustrates a target denial apparatus 10 which comprises a receiver 12 that includes an antenna and amplifier. The apparatus, which may be located on an aircraft, a ship, a ground site, or on a rocket projectile, receives threat radar signals from an enemy source which is attempting to detect the position and/or velocity of a friendly craft such as a ship at sea. Upon detection of the incoming threat signal, the apparatus generates a sequence of cover and deception signals which it retransmits over a transmitter 14 to confuse the interrogating enemy radar. An example is given in FIG. 1 to aid in understanding the system. In the example, a frequency spectrum of the received signal is indicated by the graph 16, which shows a received signal having a carrier or center frequency of 9.1 GHz (gigahertz), with a bandwidth of 10 MHz (megahertz). Another graph 18 is also provided which is a highly simplified graph showing the variation of the signal with time, and showing that the bursts last for 1 microsecond, and that the carrier signal (9.1 GHz) is phase or frequency modulated. At such radar frequencies that are well above 1 GHz, analog circuits are generally used to process signals in real time.

In this example, it is assumed that the center frequency of the radar burst, or pulse, or pulse train, can vary between 8 and 10 GHz. The apparatus includes a filter network 20 containing six radio frequency filters. One of them, indicated at 22, passes the frequency 9.05 to 9.4 GHz, which happens to include the 9.1 GHz burst of the example. The received radar burst passes through the filter 22 and is detected by a diode 24 that generates a DC signal which is delivered over a line 26 to a switching network 28. A group of lines 30 are connected to the switching network, each line carrying a different local oscillator frequency. The local oscillator frequencies are of the same order of magnitude as the received radar burst center frequency. An oscillator and multiplier device 32 generates the multiple local oscillator frequencies. The voltage on line 26 turns on a gate 34 which passes a corresponding local oscillator frequency present on a line 30d (of 9.7 GHz), through the gate to a divider 36. The divider directs some of the local oscillator frequency signal to a mixer or superheterodyning device 38. The mixer has one input 40 carrying the received signal and another 42 carrying the local oscillator frequency, and mixes them. This produces sum and different frequencies, with the difference frequency on the mixer output being amplified by an IF (intermediate frequency) amplifier 44. The IF amplifier acts as a passband filter by allowing only the difference frequency to pass. In the example, the difference between the received and local oscillator frequencies (9.1 and 9.7 GHz) is 600 MHz.

The intermediate frequency passing along line 46, is received by a recirculation loop 48 which has an output 50 that generates a train of bursts, each having the same phase history as the input at 46. Each of these bursts enters another mixer 52 where it is superheterodyned with the same local oscillator frequency signal (9.7 GHz) from line 54. The output 56 from the mixer passes through an amplifier 58, which also acts as a passband filter to pass the difference frequency while blocking the sum frequency. The output on line 60 from the amplifier contains a series of bursts, indicated by the simplified waveforms at 62a, 62b, and 62c, each burst being very similar to the original burst indicated at 18 which was received by the receiver 12. The train of bursts may include a large number of them, such as 700, which are all very similar to the originally received burst. The train of bursts passes through a programmable amplitude and frequency shift circuit 64 which has subcircuits 114, 115 that can introduce amplitude and doppler offset shifts, controllable for each burst in the repeated burst train. The train of bursts is finally delivered to a transmitter 14 which transmits the bursts so they are picked up by the hostile radar. Since the local oscillator frequencies used in down conversion at 42 and in up conversion at 54, are derived from the same source 30d, and the phase of the incoming signal is preserved in the recirculation loop 48, the sequence of retransmitted signals 14 are identical to the input signal 14 with the exception of the intentional modulation induced in 64 where this modulation is identical to that of the true target. This assures that the threatening radar will process these signals with the same efficiency as it processes true target signals assuring that the target denial device is operating at optimum efficiency and with minimum power requirements and will induce a sequence of false targets which will cover, confuse, and deceive the enemy radar.

The target denial apparatus 10 can operate very rapidly to transmit jamming bursts after receiving a hostile radar signal. For example, a first burst may be transmitted a few microseconds after receiving a pulse, and additional bursts may be transmitted at average intervals of a microsecond. The received signal passes rapidly through a filter of the filter network 20 to rapidly open the gate 34. The oscillator and multiplier circuit 32 continuously (prior to receipt of an enemy burst) produces all of the local oscillator frequencies so they can immediately pass through the gate to the divider 36 and to the mixer 38. A delay differential can be introduced by a delay device 66, so that the time of signal propagation between the receiver and mixer 38, is longer than the time of propagation between the receiver and detector 24. This allows the local oscillation frequency to reach the mixer before or at the same time as the received burst. The differential delay device 66 can be provided by an additional length of waveguide or coaxial cable, and/or the use of an optical transmission line along path 26.

A control circuit 70 is provided to control various parts of the system. The control circuit has outputs 72, including one 72a which controls the doppler offset circuit and another 72b which turns off the recirculation loop after the required number of generated bursts have been produced and/or when a next hostile radar signal is detected.

Figure 2:
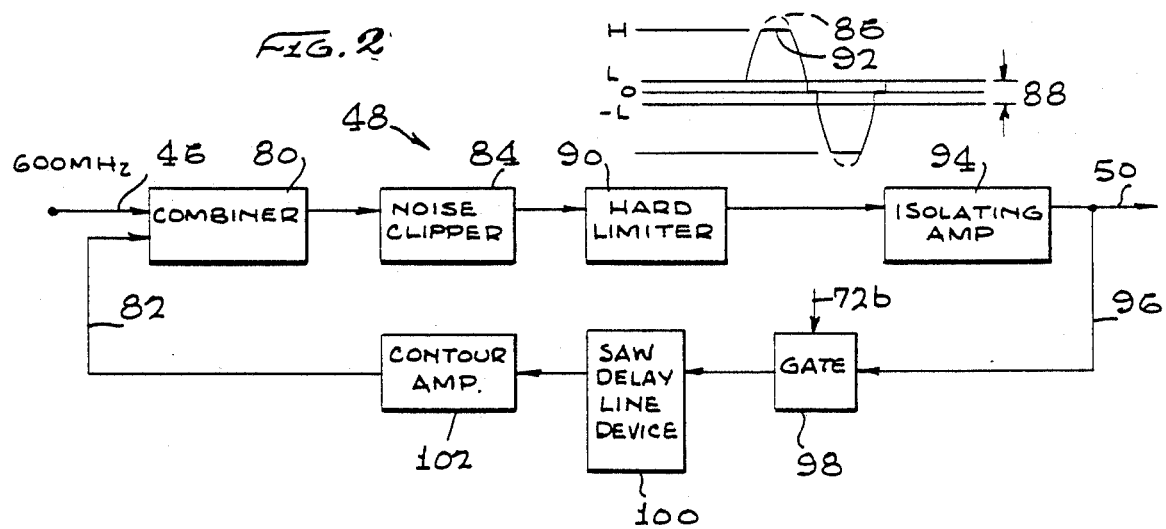
FIG. 2 is a more detailed view of the recirculation loop of the apparatus of FIG. 1.

FIG. 2 illustrates some details of the recirculation loop 48 which receives an intermediate frequency burst on its inlet 46 and which delivers a long sequence of similar bursts on its output 50. The loop includes a combiner 80 which can receive inputs from the loop input 46 or a recirculation input 82, and which delivers the combined signal to a noise clipper 84. The noise clipper passes only voltages above a predetermined absolute value, and blocks voltages below that level. For a sinusoidal wave indicated at 86, the noise limiter blocks that portion of the wave in the region 88 which is less than L or above −L. The signal passing through the noise clipper also passes through a hard limiter or clipper 90 which limits all portions of the signal which have an absolute value greater than a predetermined amount H. Thus, the sinusoidal wave 86 is clipped to look like a trapezoidal wave at the location 92.

The output of the hard limiter or high-level limiter 90 is delivered to an isolating amplifier 94 which amplifies the signal to make up for losses in the recirculation loop. The isolating amplifier also blocks high frequency intermodulation components resulting from the noise clipping and hard limiting. The output of the amplifier not only passes to the output 50 of the loop, but passes along a recirculation loop portion on line 96 to a gate 98 that is controlled by a logic circuit line 72b, which closes the gate at receipt of a hostile radar burst and after transmission of the desired numbers of jamming bursts.

The burst passing through the gate 98 passes through a SAW (surface acoustic wave) delay line device 100 which is a commonly available piezoelectric device for delaying a signal. Such devices are commonly available which have a 350 to 370 MHz bandwidth, centered around a frequency of 700 MHz. The output of the delay device is delivered to a contour amplifier 102. The primary purpose of the contour amplifier is to reduce intermodulation products noise buildup generated by the limiting circuits 84 and 98, and especially the hard limiter 90, and also to reduce mismatches from residual internal acoustic reflections from the SAW device 100. In this way, the contour amplifier acts largely as a passband filter. The output of the contour amplifier is delivered to the input 82 of the combiner to recirculate the signal burst.

If the amplification of signals passing through the loop is slightly less than one, then the signals will gradually die out. If the amplification is slightly more than one, then the signals will gradually build up to very high amplitudes. Applicant chooses an amplification of approximately but greater than one, and uses the hard limiter 90 to prevent the uncontrolled buildup of the amplitude of the signals. The amplification of more than one, however, could result in low level noise in the system being amplified in every pass through the system until the noise appeared as part of the burst, which would provide unwanted additions to the encoding of the burst. The noise limiter 84, which blocks all noise below a certain level, avoids such build up of noise during each pass of the burst signal. The result of the hard limiting is that only frequency or phase modulation of the recirculating signal is preserved, while no amplitude modulation is preserved. However, if the originally received burst appears to be amplitude modulated (i.e., the peaks of the oscillations vary in amplitude), as indicated in FIG. 1 for the waveform 106, then an amplitude sensor 108 (e.g., a low pass filter) can be provided whose output on line 110 is a wave indicated at 112 which retains only the amplitude modulation of the received wave. This signal 112 can be stored and repeatedly used by an amplitude modulator 114 of the circuit 64 to introduce amplitude modulation to the bursts before they are transmitted, i.e., to produce a variation in amplitude similar (i.e., proportional) to that detected by the amplitude sensor. In many applications, only the phase or frequency modulation is of importance.

Figure 3:
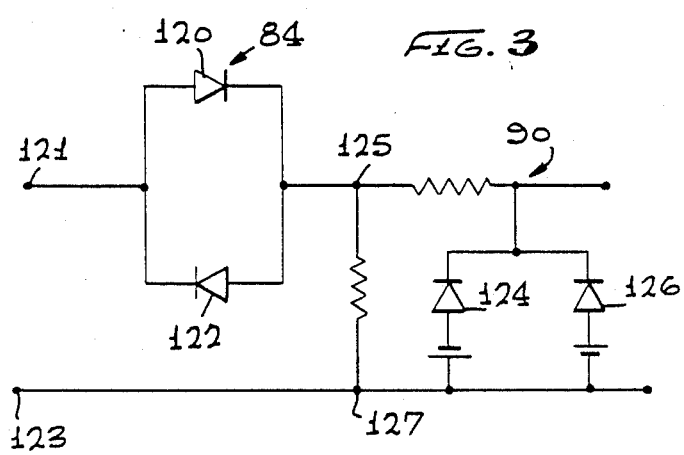
FIG. 3 is a schematic view of some of the blocks in the block diagram of FIG. 2.

The noise clipper and hard limiter 84, 90 of FIG. 2 can be implemented by the circuit shown in FIG. 3. The noise limiter, or low level limiter 90 is formed by a pair of diodes 120, 122 which each conducts in a forward direction only when the voltage across it exceeds a predetermined low level to thereby block signals below that level. The hard limiter 90 includes a pair of diodes 124, 126 coupled through voltage sources to ground, so a corresponding diode conducts only when the signal amplitude exceeds a predetermined value to limit the signal to the value. The two diodes limit the absolute value. High and low voltage, or potential, inputs 121, 123 and high and low voltage, or potential outputs 125, 127 are provided at the noise clipper, with the terminals 125, 127 forming inputs to the hard limiter and terminals carrying high absolute value voltages.

Figure 4:
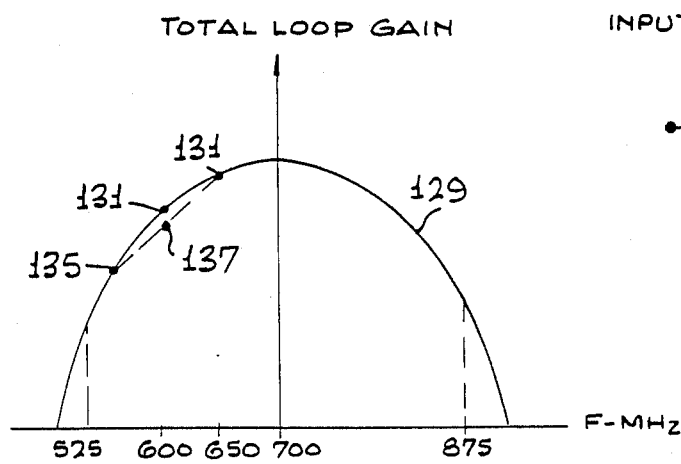
FIG. 4 is an illustration of the desired contour amplifier of FIG. 2 bandpass gain characteristics in frequency space.

The interaction of noise components with the desired signal during hard clipping can introduce intermodulation components (i.e, phase noise) which are of equal amplitude and can lie within the passband of the recirculation loop. It is recognized that the only important intermodulation signals are always symmetrically disposed in phase about the incoming signal, and that the average of these signals always falls at the same phase as the desired signal. Therefore we introduce a contoured amplifier 102 whose gain is contoured monotonically downward in frequency space over the loop bandpass as illustrated in the graph 129 of FIG. 4. This assures that the average gain of the noise signal intermodulation products are always less than the loop signal gain (which is set to very slightly over unity), and are therefore always at a gain less than unity and supressed relative to the desired signal. FIG. 4 shows an example where the center frequency at 131 is 600 MHz, a harmonic noise at 133 is at 650 MHz and residual noise at 135 is at 550 MHz. The average gain in the recirculation loop at these two noise frequencies, indicated at point 137, is less than the gain of the center frequency at 131, and therefore if the loop gain is only slightly over unity the noise will not increase without limit. The gain indicated by graph 129 has a derivative, or slope, that progressively decreases at progressively greater frequencies (from a high positive valve through zero to a large negative value), in its passband (e.g., 525 to 875 MHz).

Figure 5:
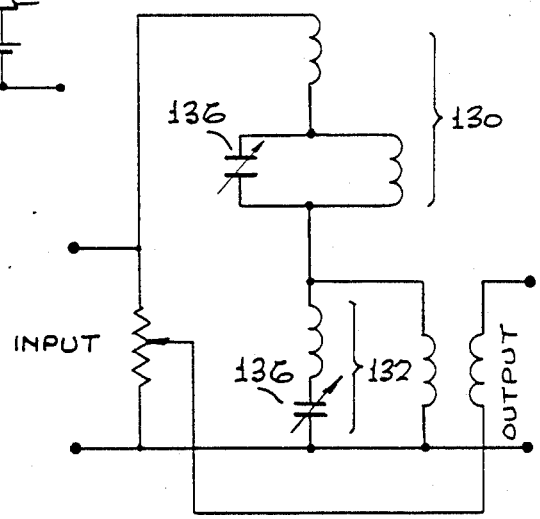
FIG. 5 is a block diagram of the contouring circuit used to achieve the contour of FIG. 4.

FIG. 5 illustrates a bandpass generator contour circuit, which is part of the contour amplifier, and which acts as a controlled dispersion filter in series with the noise clipper and hard limiter. The contour amplifier bandpass generator circuit of FIG. 5 is essentially a voltage divider formed by two different resonant circuits 130, 132. The mix of the impedances of the two circuits 130, 132 determines the passband of the contour amplifier. It is possible to vary the impedances, as by varying the capacitors 134, 136 to change the passband in accordance with FIG. 4.

Figure 6:
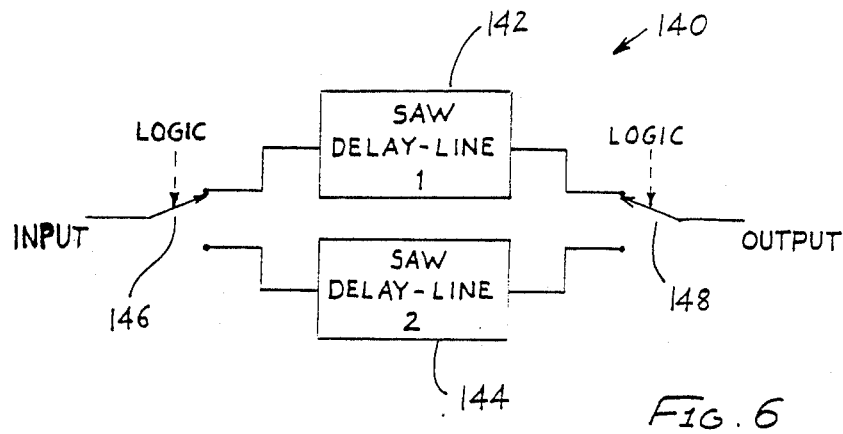
FIG. 6 is an alternate delay line device useful in FIG. 2.

Although the SAW delay device 100 is largely "flat" across a wide bandwidth, it can produce ripples of gain across its bandwidth. Continuous recirculation over the same path may integrate the effects of these fixed ripples. However an interruption of the recirculation before the ripples build up sufficiently o pass through the noise clipper circuit, will suppress the ripples where one SAW delay device has a higher than average gain at one frequency (i.e., a ripple of gain). FIG. 6 illustrates an alternate circuit portion 140 which can be used to minimize the build up of such recirculating ripples, if required. In FIG. 6, two alternate loop portions formed by delay line devices 142, 144 are provided which may have the same or close to the same delays, but which will have different ripple characteristics due to the fact that the ripple characteristics of each individual SAW delay device is different. A pair of switches 146, 148 switch different delay lines into the circulation loop, such as at every other or every third circulation. Where one SAW delay device has a higher than average gain at one frequency, the other will have an average lower than average gain at that frequency, to help avoid too high or too low a gain at that frequency during many recirculations. More than two delay devices can be alternately switched in.

Thus, the invention provides a repeater jammer apparatus that can use existing small solid state components and that is of relatively simple construction, which can quickly detect a received radar burst and rapidly generate a long sequence of cover, confusion and deception signal bursts similar to those received from a sequence of true targets by the threat radar, with the dynamic properties of the bursts under friendly control. A recirculating loop for generating multiple bursts, includes a low limiting circuit that blocks portions of signals below a predetermined value. The low limiting circuit avoids the build up of noise when used in a loop that includes an amplifier, and a hard limiter that clips signals above a predetermined amplitude to retain their phase, and which can include a contoured amplifier to suppress intermodulation noise components. The receiver circuit of the apparatus includes a plurality of radio frequency filters, with one of them passing the frequency band of the enemy radar signal, so a corresponding one of a plurality of local oscillator frequencies that are all continously generated, can be used to mix with the received signal for recirculating in an IF loop. A differential time delay assures that the appropriate local oscillator frequency arrives at the loop down converter prior to or at the same time as the signal. The apparatus also includes an amplitude and doppler offset modulation means to control the signature of the synthetic target stream generated by the apparatus so as to maximize the cover, confusion, and/or deception which friendly forces wish to impart on the enemy radar system.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a recirculation loop of a repeater jammer apparatus, which generates a plurality of output bursts that are largely similar to an input burst, the improvement comprising:

amplifier means in said loop for amplifying a signal circulating through said loop by more than one;

hard limiter means for limiting the amplitude of a signal circulating through said loop to limit those portions of a circulating signal which are above a first predetermined level to said levels, to thereby avoid excessive signal amplification of a signal after a plurality of passes through said loop while preserving the desired phase history of the input signal during each recirculation;

low level limiter means for blocking the portion of a signal circulating through said loop which is below a second predetermined level, whereby to limit the buildup of noise.

2. The improvement described in claim 1 including:

means for detecting the variation in amplitude with time of said input burst, before it is recirculated through said loop, and for amplitude modulating a plurality of output bursts produced by said recirculation loop to produce a variation in amplitude with time therein similar to that detected.

3. A repeater jammer apparatus comprising:

a receiver for receiving radar signals that each comprise a high frequency signal burst lasting for a limited time period;

means for providing a plurality of local high frequency oscillator signals;

means for mixing a local high frequency oscillator signal with said received radar signal burst to generate a first intermediate frequency signal burst;

means for sequentially generating a plurality of intermediate frequency signal bursts that are each similar to said first intermediate frequency burst, for mixing each of said intermediate frequency bursts with said local oscillator signal to produce generated high frequency bursts, and for transmitting at least portions of said generated high frequency bursts;

said means for providing a local high frequency oscillator signal comprises means for individually detecting signals in each of a plurality of different frequency bands in the received radar signal burst; and said means for providing local high frequency signals includes means for generating a plurality of local oscillator signals of different local oscillator frequencies, each local oscillator signal corresponding to at least one of said detectable frequency bands in the received burst, and means responsive to the particular frequency band in which signals in the received burst are detected for coupling a corresponding local oscillator signal to said mixing means.

4. The apparatus described in claim 3 wherein:

said means for generating a plurality of local oscillator signals includes means for continuously generating all of said local oscillator signals prior to receipt of a radar signal, whereby to provide a rapid response.

5. A repeater jammer apparatus comprising:

a receiver for receiving radar signals that each includes a high frequency signal burst lasting for a limited time, the burst being both frequency and amplitude modulated;

means for sensing the amplitude modulation of said burst;

a recirculation loop which includes an input, amplifier means that amplifies by more than unity, a hard limiter which limits the amplitude of the circulating burst to a predetermined level, and an output which carries a sequence of said bursts which are frequency modulated but not amplitude modulated;

means responsive to said sensing means for amplitude modulating each burst from the output of said recirculation loop; and a transmitter and means for coupling said amplitude modulating means to said transmitter.

6. A repeater jammer apparatus comprising:

a receiver for receiving radar signals that each comprise a high-frequency signal burst lasting for a limited time period, and which is frequency modulated;

first means coupled to said receiver for generating an intermediate frequency signal burst which contains the frequency modulation of said high-frequency burst;

second means defining a recirculation loop which has an input coupled to said first means, and which has an output, for sequentially generating a plurality of intermediate frequency output bursts which each has the same frequency modulation of said intermediate frequency burst, but which is substantially devoid of amplitude modulation;

third means coupled to the output of said second means for sequentially generating a plurality of high-frequency signal bursts each frequency modulated by a corresponding intermediate frequency output burst.

7. In a recirculation loop of a repeater jammer apparatus, which generates a plurality of output burst that are largely similar to an input burst, the improvement comprising:

amplifier means in said loop for amplifying a signal circulating through said loop by more than one;

hard limiter means for limiting the amplitude of a signal circulating through said loop to limit those portions of a circulating signal which are above a first predetermined level to said level, to thereby avoid excessive signal amplification of a signal after a plurality of passes through said loop while preserving the desired phase history of the input signal during each recirculation;

low level limiter means for blocking the portion of a signal circulating through said loop which is below a second predetermined level, whereby to limit the buildup of noise;

a plurality of alternate lop portions, each constructed so it can carry a signal which circulates through said lop, each loop portion including means that performs a different defined function on said signal; and said recirculation loop includes means for switching a different one of said loop portion at different times, whereby to minimize the buildup of gain ripples which are peculiar to one of said loop portions.

8. The improvement described in claim 7 wherein:

said alternate loop portions each include a delay device which delays the signal passing therethrough.

9. A repeater jammer apparatus comprising:

a receiver for receiving radar signals that each comprise a high frequency signal burst lasting for a limited time period;

means for providing a plurality of local high frequency oscillator signals;

means for providing a plurality of local high frequency oscillator signals;

means for mixing a local high frequency oscillator signal with said received radar signal burst to generate a first intermediate frequency signal burst;

means for sequentially generating a plurality of intermediate frequency signal bursts that are each similar to said first intermediate frequency burst, for mixing each of said intermediate frequency bursts with said local oscillator signal to produce a generated high frequency burst, and for transmitting at least portions of said generated high frequency bursts;

said means for providing a local high frequency oscillator signal comprises means for individually detecting signals in each of a plurality of different frequency bands in the received radar signal burst;

said means for providing local high frequency signals includes means for generating a plurality of local oscillator signals of different local oscillator frequencies, each local oscillator signal corresponding to at least one of said detectable frequency bands in the received burst, and means responsive to the particular frequency band in which signals in the received burst are detected for coupling a corresponding local oscillator signal to said mixing means;

said means for sequentially generating intermediate frequency signal bursts comprises a recirculating loop, said loop having a plurality of delay devices that each delay a different one of said devices into said loop to direct a circulating pulse through a different delay device at different times.

10. A method for use in a target denial apparatus, for generating a series of pulse trains that are similar to a received pulse train, comprising:

amplifying a representation of a received pulse train;

clipping all portions of said pulse train that exceed a predetermined amplitude;

blocking all portions of said pulse train which are less than a predetermined amplitude;

transmitting the pulse train;

circulating said received pulse train through a delay device, and again performing said steps of amplifying, clipping, blocking, and transmitting of said pulse train after each circulation;

said step of amplifying includes amplifying different frequencies by different amounts, in accordance with a function that is represented by a graph of gain versus frequency whose slope progressively decreases at progressively increasing frequencies, within a predetermined passband.

* * * * *

UNITED STATES PATENT AND TRADEMARK OFFICE
CERTIFICATE OF CORRECTION

PATENT NO. : 4,816,832
DATED : March 28, 1989
INVENTOR(S) : Archie Gold and Robert L. Kirkwood It is certified that error appears in the above-identified patent and that said Letters Patent is hereby corrected as shown below:

On the title page, item [54],
change "DENTAL" to --DENIAL--.

Column 7, line 6, change "levels" to --level--.
Column 8, line 51, change "lop" to --loop--.
         line 53, change "lop" to --loop--.
         line 57, change "portion" should read -- portions into said loop to direct the signal through a different loop portion --.

Signed and Sealed this
Twenty-eighth Day of November 1989

Attest:

JEFFREY M. SAMUELS

*Attesting Officer*     *Acting Commissioner of Patents and Trademarks*